3,038,899
MIXED INORGANIC-ORGANIC SALTS
Robert H. Sifferd, Joliet, Ill., assignor to The Saltec Corporation, Concord, N.H., a corporation of New Hampshire
No Drawing. Filed Nov. 16, 1959, Ser. No. 852,924
7 Claims. (Cl. 260—242)

This invention relates to mixed inorganic-organic salts, and more particularly to mixed salts of polyvalent organic acids containing both inorganic and organic cations.

This patent application is in part a continuation of my co-pending patent applications, Serial Nos. 691,138 and 691,139, both filed October 21, 1957, both now abandoned.

There is contemplated by this invention a mixed organic-inorganic salt including (1) two or three anionic fragments of an organic acid, each of such anionic fragments being a hydrocarbon having from 2 to 22 carbon atoms and containing two acid groups bonded to different carbon atoms thereof, the acid groups in each of such anionic fragments comprising in combination one of the following combinations:

(a) A sulfonic acid group with a carboxylic acid group,
(b) A sulfonic acid group with a phenolic hydroxy group,
(c) A carboxylic acid group with a phenolic hydroxy group, or
(d) A carboxylic acid group with an arsonic acid group;

(2) one and the same acid group of each of such anionic fragments being combined with one and the same divalent or trivalent metal such that the two or three anionic fragments are linked together through such metal; and (3) the other and the same acid group of each of such anionic fragments being combined with an organic ammonium group.

It will be apparent from the foregoing that in these mixed salts the two acid groups of the anionic fragments thereof differ one from the other in the degree to which each is dissociable or ionizable. That is, for example, a sulfonic acid group demonstrates a greater degree of dissociability or ionizability than does a carboxylic acid group.

In the experiments leading to this invention it was discovered that when two moles of an organic acid containing, for example, a sulfonic acid group and a carboxylic acid group, were mixed in a suitable solvent with one mole of, for example, a divalent metal, the resulting intermediate salt consisted of two molecules of the organic acid linked to the divalent metal through the sulfonic acid groups thereof, i.e. through the acid group of the organic acid demonstrating the greater degree of ionizability. Then, when this intermediate salt was mixed in a suitable solvent with an amine or a quaternary ammonium compound, on the basis of one mole of such amine or quaternary ammonium compound per mole of the organic acid from which such intermediate salt was derived, the resulting mixed salt contained per molecule one organic ammonium radical combined with each of the carboxylic acid groups of each of the two anionic fragments therein, as well as two of such anionic fragments linked through the divalent metal to the sulfonic acid groups thereof.

In these mixed salts, the organic ammonium group may be derived from a primary, secondary or tertiary amine, or a quaternary ammonium compound, or a heterocyclic amine.

The mixed salts of this invention can be prepared by a process involving combining in a suitable solvent equivalent amounts of the organic acid and either (1) a salt of the divalent or trivalent metal or (2) an amine or a quaternary ammonium compound to obtain the corresponding intermediate salt. When a salt of the divalent or trivalent metal is employed in this step the intermediate salt will contain such metal combined with the acid group of the organic acid demonstrating greater ionizability, whereas when an amine or a quaternary ammonium compound is employed in this step the intermediate salt will contain an ammonium group combined with the acid group of the organic acid demonstrating greater ionizability. Then the intermediate salt is combined with a suitable solvent with an equivalent amount of the other of either (1) a salt of the divalent or trivalent metal or (2) an amine or a quaternary ammonium compound to obtain the corresponding mixed salt. When a salt of the divalent or trivalent metal is employed in this step the mixed salt will contain such metal combined with the acid group of the organic acid demonstrating lesser ionizability, whereas when an amine or quaternary ammonium compound is employed in this step the mixed salt will contain an ammonium group combined with the acid group of the organic acid demonstrating lesser ionizability.

For the purposes of this invention, an "equivalent amount" of the organic acid refers to the molecular weight in grams of the organic acid divided by one-half of the number of acid groups contained therein. Also, an "equivalent amount" of the divalent or trivalent metal refers to the atomic weight thereof in grams divided by the number of valencies of such metal which are to be satisfied in the reaction with the organic acid.

For example, trimethyloctadecyl ammonium (alpha cupric sulfonate) stearate can be prepared by combining with water equivalent amounts of cupric hydroxide (0.5 mole) and alpha sulfo-stearic acid (1 mole) to obtain the intermediate salt cupric (heptadecyl-1-carboxyl) sulfonate, then combining with the resulting solution of such intermediate salt an equivalent amount of trimethyloctadecyl ammonium hydroxide (1 mole) to produce an aqueous suspension of the mixed inorganic-organic salt, thereafter separating the insoluble mixed salt from the residual aqueous solution, and dehydrating the separated mixed salt to obtain a dry powder form thereof. In preparing the isomeric trimethyloctadecyl ammonium (heptadecyl-1-cupric carboxylate) sulfonate, it will be found that the intermediate salt trimethyloctadecyl ammonium (heptadecyl-1-carboxyl) sulfonate is substantially insoluble in water, and thus such intermediate salt can be more efficiently obtained in an organic solvent such as methylethyl ketone. Consequently, this isomer can be prepared by combining in methylethyl ketone equivalent amounts of trimethyloctadecyl ammonium hydroxide (1 mole) and alpha sulfo-stearic acid (1 mole) to obtain the intermediate salt, then combining with the methylethyl ketone solution of such intermediate salt a minor portion of an aqueous suspension containing an equivalent amount of cupric hydroxide (0.5 mole), whereupon the cupric hydroxide will be seen to diffuse into the methylethyl ketone phase of the resulting solvent mixture to react with the intermediate salt in forming the mixed inorganic-organic salt, thereafter separating the aqueous phase of such mixture from the methylethyl ketone phase thereof, and subjecting the separated methylethyl ketone solution to evaporation in obtaining the mixed salt in dry form.

However, a suspension of the intermediate salt in a suitable inert solvent system may be reacted with the second cation compound to obtain the mixed salt of this invention, providing such mixed salt is less soluble in the solvent system than the intermediate salt. Accordingly, although only a minor portion of the intermediate salt may be in solution form at any given instant, the continuous insolubilization of the mixed salt tends to shift the reaction towards completion. Exceptional resalts have been obtained when water and methylethyl ketone have been employed as solvents in the formation of these mixed salts, but it will be apparent to those skilled in the art that other readily ascertained solvents may also be utilized in this sequence of reactions.

The preparation of these mixed salts will be governed generally by the phenomenon of electrolytic dissociation. That is, salt formation will be generally favored by an alkaline shift of pH in the reaction mixture, while acidification thereof tends to effect displacement of the metal or the organic ammonium group from the organic acid. Consequently, it is desirable to react the organic acid or the intermediate salt with the metal or the amine or quaternary ammonium compound as a base, and especially desirable results are obtained when the metal or the quaternary ammonium compound is in the hydroxide form. However, there may be utilized metal salts or quaternary ammonium salts, such as chlorides, providing that there is added to the reaction mixture an alkali, such as sodium hydroxide, to neutralize the anion by-products, such as the chloride ions.

It will now be seen that the foregoing method for preparing these mixed inorganic-organic salts is applicable to the recovery and concentration of polyvalent inorganic cations, especially rare and radioactive polyvalent metals, contained, for example, in solution or suspension form. That is, a solution or suspension of a polyvalent inorganic base which is to concentrated or recovered is treated with an organic ammonium sulfonate of a polybasic acid containing at least one carboxylic acid radical and at least one sulfonic acid radical such that there is formed the corresponding mixed inorganic-organic salt. In accordance with this procedure, it has been found that substantially quantitative recovery of the inorganic cation can be achieved when there is employed an approximately equivalent concentration of such organic ammonium sulfonate, even when a dilute solution or suspension of the inorganic base is subjected to treatment.

Also, the mixed inorganic-organic salts of this invention are useful in inhibiting the growth of microorganisms.

This invention can be further illustrated by the following specific examples:

EXAMPLE I

Trimethyloctadecyl ammonium (alpha calcium sulfonate) stearate can be prepared by the following method:

Alpha sulfo stearic acid, in the amount of 36.4 gms., is combined with 750 ml. of water to obtain a 5% aqueous solution thereof. To this aqueous solution is added calcium hydroxide, in the amount of 3.7 gms., to obtain, as the intermediate salt, calcium (heptadecyl-1-carboxyl) sulfonate.

Then, to the foregoing aqueous solution of the intermediate salt is added 32.90 gms. of trimethyloctadecyl ammonium hydroxide to obtain the corresponding mixed inorganic-organic salt. The resulting precipitate of such mixed salt is separated from the supernatant liquid by centrifugation. This separated precipitate is then subjected to evaporation to obtain the mixed salt in dry powder form.

EXAMPLE II

Trimethyl ammonium (alpha cupric sulfonate) palmitate can be prepared by the following method:

Alpha sulfo palmitic acid, in the amount of 33.6 gms., is combined with 750 ml. of methylethyl ketone to obtain an approximately 5% organic solvent solution thereof. To this organic solvent solution is added 5.9 gms. of trimethyl amine to obtain, as the intermediate salt, trimethyl ammonium (pentadecyl-1-carboxyl) sulfonate.

To the foregoing solvent solution of the intermediate salt is added 75 cc. of an aqueous suspension containing 4.9 gms. of cupric hydroxide.

The conversion of the aqueous phase of the resulting solvent mixture from a suspension to a solution will indicate completion of the reaction to form the mixed inorganic-organic salt. Thereupon, the aqueous phase of such solvent mixture can be separated from the organic solvent phase thereof by decantation. Then, the separated methylethyl ketone solution can be evaporated to dryness by distillation to obtain the mixed salt in dry powder form.

EXAMPLE III

The effectiveness of the mixed inorganic-organic salts of this invention in inhibiting the growth of microorganisms was determined by the following method:

The following mixed salts were subjected to analysis, and the number preceding each of such mixed salts will be employed in reference thereto in the test results hereinafter:

(1) Trimethyloctadecyl ammonium (alpha cupric sulfonate) stearate
(2) Trimethyloctadecyl ammonium (heptadecyl-1-cupric carboxylate) sulfonate
(3) Piperazinium (alpha cupric sulfonate) stearate
(4) Trimethyloctadecyl ammonium (heptadecyl-1-carboxylate) sulfonate
(5) Trimethyloctadecyl ammonium (alpha cadmium sulfonate) stearate
(6) Trimethyloctadecyl ammonium (alpha calcium sulfonate) stearate
(7) Trimethyloctadecyl ammonium (alpha cobaltous sulfonate) stearate
(8) Trimethyloctadecyl ammonium (alpha mercuric sulfonate) stearate The following microorganisms were employed in the analysis, and the letter preceding each of such microorganisms will be employed in reference thereto in the test results hereinafter:

A. *Saccharomyces cerevisiae*
B. *Saccharomyces fragilis*
C. *Penicillium glaucum*
D. *Aspergillus fonsecaens*
E. *Escherichia coli*
F. *Micrococcus albus*

The nutrient medium employed in this analysis is referred to as Bacto-Penassay dextrose agar in the Ninth Edition of the Difco Manual, pages 204–205, and had the following composition:

| | |
|---|---|
| Beef extract _____gms__ | 1.5 |
| Yeast extract _____gms__ | 3.0 |
| Peptone _____gms__ | 6.0 |
| Agar _____gms__ | 15.0 |
| Dextrose _____gms__ | 30.0 |
| Distilled water _____liters__ | 1 |

In the test procedure, the nutrient medium was poured into 12 petri plates and allowed to solidify therein. An inoculum of 0.5 ml. of each of the test microorganisms was introduced into the petri plates, two plates per microorganism, and the inoculum was spread evenly with a glass rod over the surface of the nutrient medium therein. Thereafter, a few crystals of each of the foregoing mixed salts were introduced on the surface of the nutrient medium in the inoculated petri plates at least 1½ inches apart, four of the mixed salts per petri plate. Thus, the two petri plates of such microorganism contained the spectrum of eight mixed salts.

The petri plates, containing the microorganisms and the mixed salts, were incubated, and the growth of the microorganisms in each of such plates was determined at intervals of 24, 48 and 72 hours. The yeasts and molds were incubated at a temperature of 30 degrees centigrade, while the bacteria were incubated at a temperature of 37 degrees centigrade.

The results of this analysis are set forth in the following tables in which growth of the microorganisms is indicated by a plus (+) sign, in which inhibition of the microorganisms is expressed by a minus (—) sign, and in which indetermined growth or inhibition of the microorganisms is expressed by a plus/minus (±) sign:

24 Hours

| Mixed salt | E | F | A | B | C | D |
|---|---|---|---|---|---|---|
| 1 | ± | − | + | + | + | + |
| 2 | + | + | + | + | + | + |
| 3 | + | − | + | + | + | + |
| 4 | + | ± | + | + | + | + |
| 5 | ± | − | − | ± | + | + |
| 6 | + | + | + | + | + | ± |
| 7 | + | + | + | + | + | + |
| 8 | − | − | − | − | − | ± |

48 Hours

| Mixed salt | E | F | A | B | C | D |
|---|---|---|---|---|---|---|
| 1 | + | ± | + | + | + | ¹+ |
| 2 | + | + | + | + | + | + |
| 3 | + | ± | + | + | + | + |
| 4 | + | − | + | + | + | + |
| 5 | − | ± | − | − | ± | (¹) |
| 6 | + | + | ± | − | + | + |
| 7 | + | + | ± | ± | + | + |
| 8 | − | − | − | − | − | + |

¹ No sporulation.

72 Hours

| Mixed salt | E | F | A | B | C | D |
|---|---|---|---|---|---|---|
| 1 | + | − | + | + | + | + |
| 2 | + | + | + | + | + | + |
| 3 | + | ± | + | + | + | + |
| 4 | + | − | + | + | + | + |
| 5 | ± | − | ± | ± | (¹) | (²) |
| 6 | + | + | ± | − | + | + |
| 7 | + | + | ± | ± | + | + |
| 8 | − | − | − | − | − | + |

¹ No sporulation.
² Spores beginning to appear at the outer edge of the growth zone.

Compound No. 4 is a control in which the polyvalent inorganic cation component was omitted. These results demonstrate that the mixed salts of this invention are selectively inhibitory of the growth of microorganisms.

EXAMPLE IV

The mixed inorganic-organic salts of this invention were subjected to analysis in determining the inhibition of the growth of microorganisms therewith according to the following procedure:

The following mixed salts were subjected to analysis, and the number preceding each of such salts is employed hereinafter in reference thereto in the test results:

(1) Trimethyloctadecyl ammonium (alpha cupric sulfonate) stearate (2) Trimethyloctadecyl ammonium (heptadecyl-1-cupric carboxylate) sulfonate (3) Piperazinium (alpha cupric sulfonate) stearate (4) Trimethyloctadecyl ammonium (heptadecyl-1-carboxyl) sulfonate (5) Trimethyloctadecyl ammonium (alpha cadmium sulfonate) stearate (6) Trimethyloctadecyl ammonium (alpha calcium sulfonate) stearate (7) Trimethyloctadecyl ammonium (alpha cobaltous sulfonate) stearate (8) Trimethyloctadecyl ammonium (alpha mercuric sulfonate) stearate The following microorganisms were employed in the analysis, and the letter preceding each of such microorganisms will be employed in reference thereto in the test results hereinafter:

A. *Saccharomyces cerevisiae*
B. *Saccharomyces fragilis*
C. *Penicillium glaucum*
D. *Aspergillus fonsecaens*
E. *Escherichia coli*
F. *Micrococcus albus*

The nutrient medium utilized in this analysis is referred to as Bacto-Penassay base agar in the Ninth Edition of the Difco Manual, pages 204–205, and is similar to that nutrient medium set forth in Example III except that the dextrose is omitted. This nutrient medium had the following composition:

Beef extract _____gms__ 1.5
Yeast extract _____gms__ 3.0
Peptone _____gms__ 6.0
Agar _____gms__ 15.0
Distilled water _____liters__ 1

In the test procedure, each of the mixed salts was mixed with a portion of nutrient medium to obtain a 0.1% suspension thereof, and due to the minimal solubility in water of the mixed salts, they were triturated with the nutrient medium to produce a substantially uniform suspension. The resulting suspension of each microorganism was poured into a test plate such that a "slant plate" was obtained, and suspensions of two of the mixed salts were introduced into each of the plates. Then a thin layer of the nutrient medium was poured into each plate over the slants of the mixed salts suspension. Thereafter, two of the microorganisms were streaked across the surface of each of the plates. The inoculated plates were incubated, and the growth of the microorganisms therein was determined at intervals of 24, 48 and 72 hours. The yeasts and molds were incubated at a temperature of 30 degrees centigrade, while the bacteria were incubated at a temperature of 37 degrees centigrade.

The results of this analysis are set forth in the following tables, in which growth of the microorganisms is referred to as a plus (+) sign, in which inhibition of the microorganisms is referred to as a minus (−) sign, and in which indeterminate growth or inhibition of the microorganisms is referred to as a plus/minus (±) sign:

24 Hours

| Mixed salt | E | F |
|---|---|---|
| 1 | ± | ± |
| 2 | ± | − |
| 3 | + | + |
| 4 | + | + |
| 5 | + | − |
| 6 | + | − |
| 7 | − | − |
| 8 | − | − |

48 Hours

| Mixed salt | E | F | C | D |
|---|---|---|---|---|
| 1 | + | − | + | − |
| 2 | + | + | + | ¹+ |
| 3 | − | + | + | ¹+ |
| 4 | + | + | + | + |
| 5 | + | − | ± | − |
| 6 | + | − | − | − |
| 7 | − | − | − | ± |
| 8 | − | − | + | − |

¹ Sporulation.

72 Hours

| Mixed salt | E | F | A | B | C | D |
|---|---|---|---|---|---|---|
| 1 | + | − | − | − | ¹+ | ¹+ |
| 2 | + | + | − | − | ¹+ | ¹+ |
| 3 | − | + | ± | + | ¹+ | ¹+ |
| 4 | + | + | + | − | ¹+ | ¹± |
| 5 | + | − | − | − | ²± | − |
| 6 | + | − | − | − | + | − |
| 7 | − | − | ± | ± | + | ¹± |
| 8 | − | − | − | − | + | ¹± |

¹ Sporulation.
² No sporulation.

Compound No. 4 is a control in which the polyvalent inorganic cation component was omitted. These results demonstrate the selective inhibition of the growth of microorganisms by the mixed salts of this invention.

EXAMPLE V

To a solution of 14 gms. of sulfoacetic acid in 100 ml. of water is added 9.3 gms. of aniline. To the resulting preparation is added an aqueous suspension of 4.65 gms. of cobaltous hydroxide. The reaction is completed after several minutes with stirring. The product, cobaltous (alpha aniline sulfonate) acetate, is separated from the supernatant liquid, by filtration, washed with water, and dried.

EXAMPLE VI

To a solution of 22.4 gms. of alpha sulfo-octanoic acid in 200 ml. of decyl alcohol is added 39.9 gms. of didodecyl dimethyl ammonium hydroxide. The resulting solution is stirred with 100 ml. of an aqueous solution of 7.9 gms. of copper sulfate, and the emulsion so produced is adjusted to pH 6.5 by the slow addition of aqueous sodium hydroxide. Agitation is stopped, the layers are allowed to separate, and the now colorless aqueous layer is drawn off and discarded. The solvent phase is a solution of the mixed salt, cupric (alpha didodecyl dimethyl ammonium sulfonate) octanoate, a clear blue solution.

EXAMPLE VII

A solution of 17.4 gms. of 1-phenol-4-sulfonic acid in 200 ml. of water is mixed with 7.9 gms. of pyridine, and to the resulting solution is added 3.7 gms. of calcium hydroxide. The resulting mixed salt is 1-calcium (4-pyridine sulfonate) carbolate.

EXAMPLE VIII

A solution of 13.8 gms. of salicylic acid in 50 ml. of 75% aqueous ethanol is mixed with 7.3 gms. of diethyl amine, and the resulting solution is stirred with 2.9 gms. of magnesium hydroxide. The mixed salt thus produced is diethyl ammonium (magnesium phenol) carboxylate.

EXAMPLE IX

An aqueous solution of 1 mole of beta sulfopropionic acid is mixed with 1 mole of n-butylamine, and the resulting preparation is stirred with ⅓ mole of ferric hydroxide to obtain the mixed salt, ferric (beta n-butyl ammonium sulfonate) propionate.

EXAMPLE X

An aqueous solution of 1 mole of alpha sulfo butyric acid is mixed with 1 mole of piperidine, and the resulting preparation is stirred with ⅓ mole of aluminum hydroxide to obtain the mixed salt, aluminum (alpha piperidine sulfonate) butyrate.

Once the concept underlying the structure and preparation of these mixed salts has been appreciated, it will be obvious to those skilled in the art that such mixed salts may be derived from any organic acid containing at least two acid groups differing one from the other in the degree to which each is ionizable, any polyvalent metal, and any amine or quaternary ammonium compound.

Whether or not a particular organic acid is suitable for use in the preparation of these mixed salts can be readily determined on the basis that an equivalent amount of a base should react substantially completely with one of the acid groups of such organic acid while leaving the other acid group of such organic acid substantially unreacted.

Thus the mixed salts of this invention may be generally represented by the formula

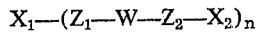

wherein the expression $-Z_1-W-Z_2-$ represents a polyvalent organic acid radical in which $Z_1$ and $Z_2$ are acid groups, wherein $Z_1$ differs relatively in ionizability from $Z_2$, wherein W represents an organic radical, wherein $X_1$ and $X_2$ are cations of which one of such $X_1$ or $X_2$ is a metal and the other of such $X_1$ and $X_2$ is an organic ammonium group, wherein of $X_1$ and $X_2$ at least $X_1$ is a polyvalent cation, and wherein $n$ is an integer of at least 2.

The integer $n$ in the foregoing formula represents the valencies of the polyvalent cation which are satisfied by combination with acid groups of the organic acid to provide a salt. Thus, in the case of a divalent cation, $n$ represents the integer 2, while with cations having a valency greater than 2, $n$ may be an integer greater than 2. However, in the latter instance all of the valencies of the polyvalent cation need not be satisfied by combination with acid groups of the organic acid, and according to this invention such valencies of the polyvalent cation in excess of 2 can be satisfied with any anion, e.g., a monovalent anion such as chloride, hydroxide and acetate.

In an especial aspect, mixed salts of this invention may be represented by the formulae

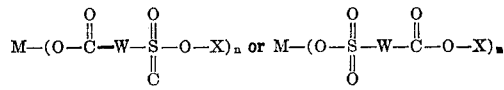

wherein M is a divalent or trivalent metal, wherein W is a hydrocarbon radical, wherein X is an organic ammonium group, and wherein $n$ is one of the integers 2 or 3.

The characterization of the acid groups of the organic acid on the basis of their degree of ionizability has reference to the phenomenon of electrolytic dissociation. Generally, the degree to which a molecule ionizes relates to the ratio of ionized to unionized molecules obtained in aqueous solution at a given temperature and at a specified concentration thereof. For example, hydrochloric acid demonstrates a greater degree of ionization than does acetic acid. In particular, a sulfonic acid demonstrates a greater degree of ionizability than does a carboxylic acid. Thus, when a sulfonic acid radical and a carboxylic acid radical are contained in a single organic compound the sulfonic acid radical is ionizable to a greater degree than is the carboxylic acid radical, and such acid radicals or anions can be said to differ in the degree to which each is ionizable. Furthermore, in a polybasic acid, structural differences will alter the relative degree to which each of the several acid groups is ionizable, such as the composition of the groups adjacent to each acid group, the presence and positioning of double bonds in the molecule, the relative position of each acid group in the molecule, and the molecular weight or chain length of the organic acid. Thus, for example, there are polycarboxylic acids in which two or more carboxylic acid radicals differ in the degree to which each is ionizable.

The polyvalent metal included in these mixed salts may be derived from any metal salt or metal base. Moreover when there is included in these mixed salts an organic acid containing in excess of two acid groups of the requisite character, there may also be included more than one metal. However, when the organic cation of the mixed salt is polyvalent, the metal may be monovalent, but when such organic cation is monovalent, the metal should be polyvalent. Especially desirable results are obtained with a divalent metal.

The organic cation of these mixed salts may be any organic ammonium group derived from an organic compound which includes at least one nitrogen-containing group having a basic reaction, i.e. a tetravalent nitrogen group having a basic reaction. Consequently, this organic cation may be derived from any primary, secondary or tertiary amine, or any quaternary ammonium compound of the aforementioned character, including mono and polyamines and mono and polyquaternary ammonium compounds. However, when the metal of these mixed salts is polyvalent, there may be employed an organic monoammonium radical, but when such metal is monovalent, the organic cation should be an organic polyammonium radical. Moreover, especially desirable results are obtained with a mixed salt including an organic monoammonium radical.

Thus, in the foregoing formulae, $X_1$ and $X_2$ may represent an organic mono or polyammonium radical, e.g., a diammonium radical having the formulae

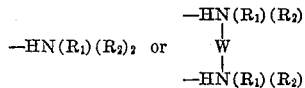

and

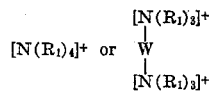

wherein $R_1$ is a hydrocarbon radical including carbon atoms adjacent to a nitrogen atom in a heterocyclic radical, wherein $R_2$ is hydrogen or a hydrocarbon radical, and wherein W is a hydrocarbon radical.

Especially desirable are those mixed salts of this invention in which the organic ammonium radical has the formulae

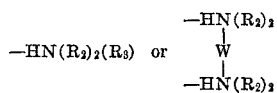

and

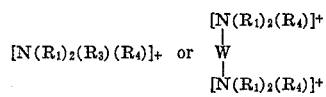

wherein $R_1$ is an alkyl group containing less than 4 carbon atoms, wherein $R_2$ is hydrogen or an alkyl group containing less than 4 carbon atoms, wherein $R_3$ is an alkyl group containing at least 10 carbon atoms, wherein $R_4$ is a benzyl group or an alkyl group containing less than 4 carbon atoms, and wherein W is a hydrocarbon radical containing at least 10 carbon atoms.

Therefore, the mixed salts of this invention include those having the formulae

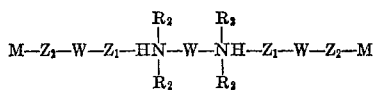

and

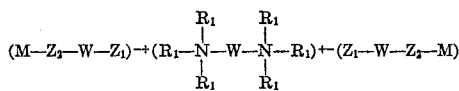

wherein M is a monovalent metal, and wherein $Z_1$, $Z_2$, W, $R_1$, $R_2$ and $R_4$ are as hereinbefore described. Another exemplary group of these mixed salts can be represented by the formulae

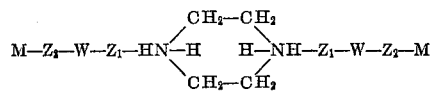

and

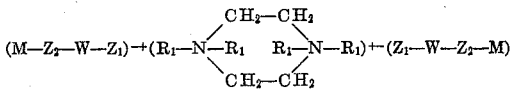

wherein the exemplary heterocyclic radical is derived from piperazine, wherein M is a monovalent metal, and wherein W, $R_1$, $Z_1$ and $Z_2$ are as hereinbefore described.

When, in the preparation of these mixed salts, there is employed a dibasic organic acid having the formula $HZ_1$—W—$Z_2H$, in which $Z_2$ demonstrates a greater degree of ionizability than does $Z_1$, the prepartion of the intermediate salt may involve the following alternative reactions (1) 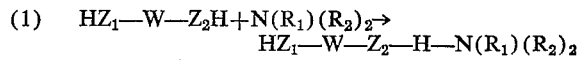

(2) 

(3) 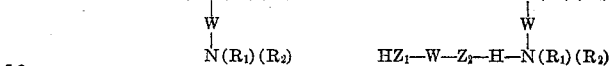

(4) 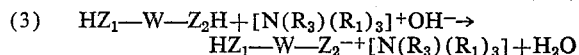

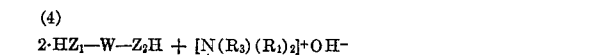

(5) $n \cdot HZ_1$—W—$Z_2H + M(OH)_n \rightarrow$
$M$—$(Z_2$—W—$Z_1$—$H)_n + n \cdot H_2O$ wherein S, M, n, $Z_1$, $Z_2$, $R_1$, $R_2$ and $R_3$ are as hereinbefore described.

The intermediate salt obtained in the foregoing reactions 1 or 3, upon reaction with a polyvalent metal base, will yield the corresponding mixed salt. For example, the reaction of the intermediate salt from 1 above will proceed as follows:

$n \cdot HZ_1$—W—$Z_2$—H—$N(R_1)(R_2)_2 + M(OH)_n$
$\rightarrow M$—$[Z_1$—W—$Z_2$—H—$N(R_1)(R_2)_2]_n + n \cdot H_2O$ Also, the reaction of the intermediate salt obtained in reactions 2 or 4 above with a monovalent metal base, as exemplified by intermediate salt 4, will proceed as follows:

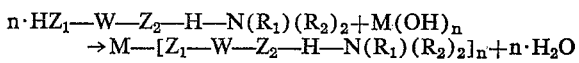

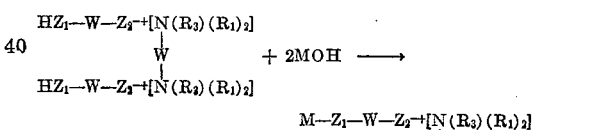

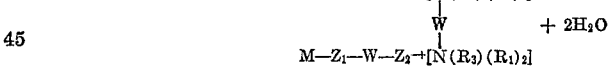

The treatment of the intermediate salt obtained in the foregoing reaction 5 with a mono or diamine or a mono or diquaternary ammonium compound will result in mixed salts differing from those illustrated above only in that the metal will be combined with acid group $Z_2$ of the organic acid instead of acid group $Z_1$ thereof, as shown in the reactions illustrated above.

While in the foregoing specification various embodiments of this invention have been set forth in considerable detail for the purpose of illustration, it will be apparent to those skilled in the art that this invention is susceptible to other embodiments and that many of these details can be varied widely without departing from the basic concept and spirit of the invention.

I claim:
1. Salts of the formula

wherein W is a hydrocarbon residue of from 2 to 22 carbon atoms, wherein M is selected from the group consisting of divalent and trivalent metals, wherein X is organic ammonium, wherein n is an integer of from 2 to 3, and wherein $Z_1$ and $Z_2$ represent a combination of acid groups selected from the group of combinations of acid groups consisting of (a) sulfonic acid with carboxylic acid, (b) sulfonic acid with phenolic hydroxy, (c) carboxylic acid with phenolic hydroxy, and (d) carboxylic acid with arsonic acid.

2. The salts of claim 1 in which M is mercuric, $Z_1$ and $Z_2$ are respectively sulfonic acid and carboxylic acid, X is quaternary ammonium, and $n$ is the integer 2.

3. Salts of the formula:

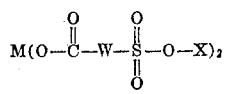

wherein W is a hydrocarbon residue of from 2 to 22 carbon atoms, wherein M is a divalent metal selected from the group consisting of cupric and mercuric, and wherein X is quaternary ammonium.

4. Trimethyloctadecyl ammonium (alpha calcium sulfonate) stearate.

5. Trimethyl ammonium (alpha cupric sulfonate) palmitate.

6. Piperazinium (alpha cupric sulfonate) stearate.

7. Cobaltous (alpha aniline sulfonate) acetate.

References Cited in the file of this patent

UNITED STATES PATENTS 2,451,549     Gzemski ---------------- Oct. 19, 1948